United States Patent
Rachal et al.

(10) Patent No.: US 7,818,384 B2
(45) Date of Patent: Oct. 19, 2010

(54) SIMULTANEOUS SYNCHRONOUS SPLIT-DOMAIN EMAIL ROUTING WITH CONFLICT RESOLUTION

(76) Inventors: Eric M. Rachal, 7001 Danwood Dr., Austin, TX (US) 78759; Peter LeBlond, 607 Bowling Ct., Cedar Park, TX (US) 78613

( * ) Notice: Subject to any disclaimer, the term of this patent is extended or adjusted under 35 U.S.C. 154(b) by 312 days.

(21) Appl. No.: 11/881,391

(22) Filed: Jul. 26, 2007

(65) Prior Publication Data
US 2009/0030993 A1    Jan. 29, 2009

(51) Int. Cl.
*G06F 15/16* (2006.01)
(52) U.S. Cl. .................................... 709/206
(58) Field of Classification Search ............. 709/206
See application file for complete search history.

(56) References Cited

U.S. PATENT DOCUMENTS

| | | | | |
|---|---|---|---|---|
| 5,937,161 | A * | 8/1999 | Mulligan et al. | 709/206 |
| 6,650,890 | B1 | 11/2003 | Irlam et al. | |
| 6,721,305 | B1 * | 4/2004 | Chan et al. | 370/349 |
| 6,915,334 | B1 * | 7/2005 | Hall | 709/207 |
| 7,103,652 | B1 | 9/2006 | Dobberpuhl et al. | |
| 7,187,921 | B1 * | 3/2007 | Jordan, Jr. | 455/412.1 |
| 7,231,403 | B1 | 6/2007 | Howitt et al. | |
| 2003/0135567 | A1 * | 7/2003 | Reilly | 709/206 |
| 2004/0059789 | A1 * | 3/2004 | Shum | 709/206 |
| 2004/0254989 | A1 * | 12/2004 | Baratakke et al. | 709/206 |
| 2005/0033813 | A1 * | 2/2005 | Bhogal et al. | 709/206 |
| 2005/0055382 | A1 | 3/2005 | Ferrat et al. | |
| 2005/0188035 | A1 * | 8/2005 | Ueno | 709/206 |
| 2005/0228867 | A1 * | 10/2005 | Osborne et al. | 709/206 |
| 2007/0028000 | A1 | 2/2007 | Ebbesen et al. | |
| 2007/0067354 | A1 | 3/2007 | Mullender et al. | |
| 2007/0220607 | A1 * | 9/2007 | Sprosts et al. | 726/24 |
| 2009/0089375 | A1 * | 4/2009 | Osterberg, Jr. | 709/206 |

OTHER PUBLICATIONS

Online tutorial for split domain routing: http://wiki.zimba.com/index.php?title=split_domain.

* cited by examiner

*Primary Examiner*—Wing F Chan
*Assistant Examiner*—Tesfay Yohannes
(74) *Attorney, Agent, or Firm*—Moster, Wynne & Ressler, P.C.; Matthew E. Burr

(57) ABSTRACT

An email address may be associated with more than one inbox on more than one server. An email sent to such an address may not be delivered automatically to all the inboxes because mail transfer agents follow a rule that each email address is uniquely associated with one inbox on one server, so such agents stop after delivering email to the first inbox. A switching mail transfer agent processes email to deliver to more than one inboxes associated with the address substantially synchronously and substantially without duplicates being delivered to the same inbox.

18 Claims, 15 Drawing Sheets

FIGURE 2

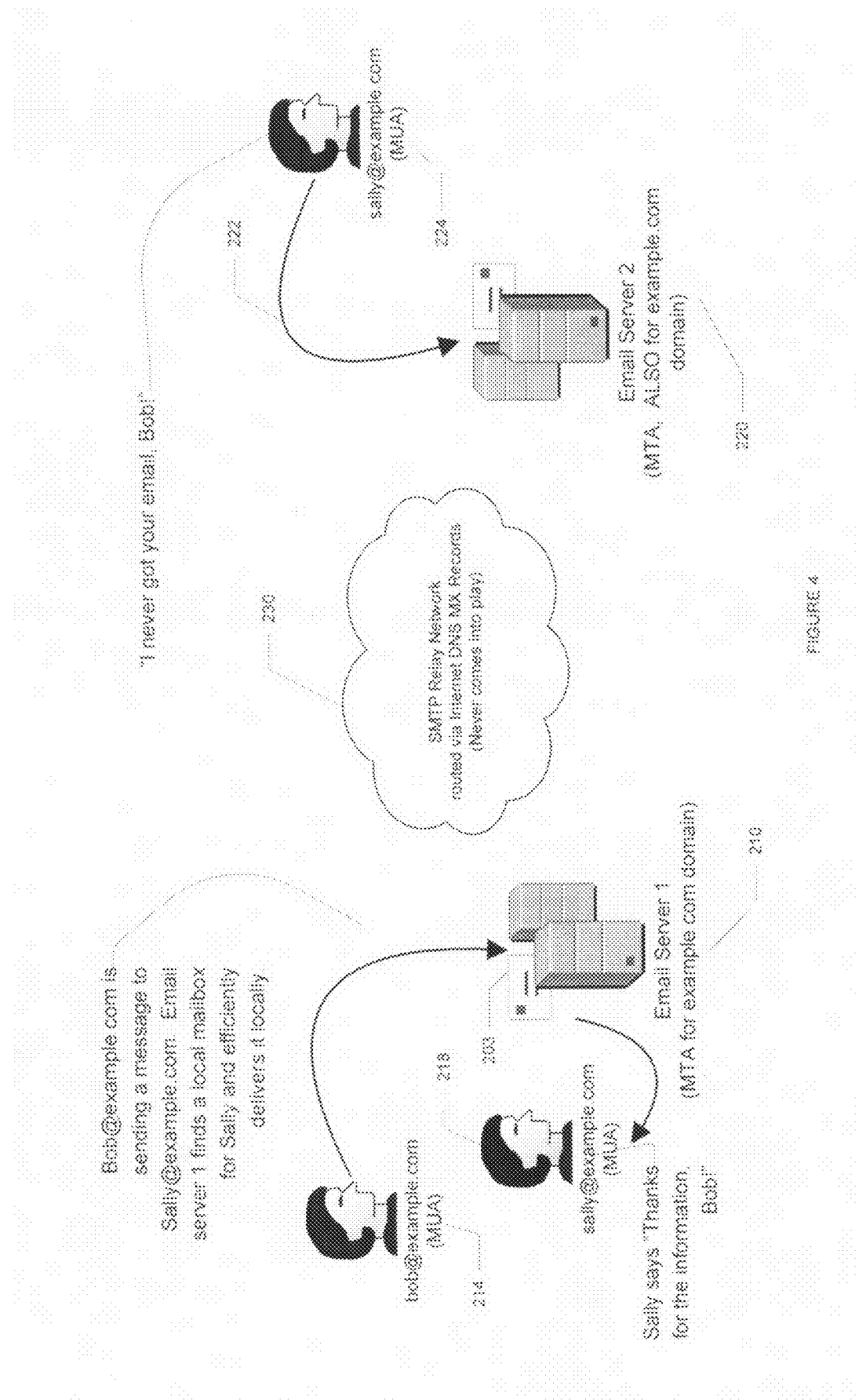

SIMULTANEOUS SYNCHRONOUS SPLIT-DOMAIN EMAIL ROUTING WITH CONFLICT RESOLUTION

TECHNICAL FIELD

This disclosure relates generally to email and more particularly to devices, media, machine readable instructions and methods for simultaneous synchronous split-domain email routing with conflict resolution.

BACKGROUND

Full email hosting is extraordinarily complex to incrementally provision because of the "duplicate recipient address" problem. That is, a single email recipient address may exist on more than one email server at the same time. This causes serious problems for any addressing system. The US postal service, for example, cannot allow two houses on the same street to have the same number.

If an email address is user@example.com, the user@ part is analogous to a house number, and the example.com part is analogous to the street name. Having duplicate recipient email addresses causes similar problems for email. In relation to email, if one can overcome the problems inherent with duplicate recipient addresses, then the advantages may be surprisingly useful.

A discussion of the following terms may be helpful for understanding the present disclosure:

1. Simultaneity refers to a single email recipient address (user1@example.com) existing simultaneously on more than one email server.
2. Synchronous refers to a single email message being delivered to each email server as a live stream of messages.
3. Split Domain refers to email recipients within the same domain (@example.com) existing on different servers.
4. Conflict Resolution refers to detecting situations where duplicate messages may be produced and preventing or resolving the conflict.

Even to those skilled in the art of email messaging technology, each one of the above concepts would be considered arcane. In combination, however, the concepts may provide an approach to the duplicate recipient address problem that has advantages for email service providers.

A common way for people to handle more than one mailbox is by forwarding email from one account to another. For example, if a person has two email accounts (john@yahoo.com and john@mycompany.com), the person can set his or her mycompany.com mail account to forward copies to his or her yahoo.com account. Then, when the person sends email from his or her Yahoo® account, he or she can set their "From:" and "Reply To:" address to be John@mycompany.com. In effect, the person spoofs the sender address.

The net effect, therefore, is that the person can use either account to both send and receive email to or from John@mycompany.com. If the person wants to be able to send and receive email from john@yahoo.com, the person could set up the same thing on the mycompany.com account. Such an approach may be satisfactory for single users, but can become a nightmare to manage for a company with many users.

Notably, in the above example, only the sender address ("From:") exists in both locations. Each mailbox destination still has a unique recipient address.

Another approach to the duplicate recipient address scenario may be to provide "receive only" email boxes that in fact carry duplicate recipient addresses. Typically, such mailboxes are for externally storing quarantined junk mail, or for storing read-only email for archiving purposes. In the case of spam quarantine accounts, however, messages are normally delivered only to one mailbox or the other (depending on whether or not the message was classified as spam). These systems do not allow users to send new email messages to other recipients. They are for reviewing email only. That means that they do not run into or solve the major problems with local recipients not being able to send messages to other local recipients and have those messages delivered to two or more mailboxes.

Email continuity or disaster recovery services may maintain duplicate mailboxes with duplicate recipient addresses for backup purposes. However, such systems rely on the "Big Red Switch" approach. In the event of a failure, all mail traffic for all users is immediately shifted from the primary system to the backup system. Since only one system is active at a time there is no duplicate address problem.

Split domain routing is an approach employed for migrating users from one server to another. A tutorial can be found at http://wiki.zimbra.com/index.php?title=Split_Domain, which is incorporated herein be reference. To do split domain routing the servers are set to be "non-authoritative." The servers are configured such that each server is aware of the other server(s), and so that if a local recipient match is not found for the local domain, it forwards the message to the other server.

In this way, some recipient addresses can exist on Server 1 and others on Server 2. A recipient address, however, may only exist on a single server. If the same recipient address were to exist simultaneous on each server, then one still encounters the duplicate recipient address problems.

Duplicate message prevention may resolve email message conflicts involving synchronizing two email clients asynchronously. The most common and familiar example of this is synchronizing a remote PDA device or cell phone with a desktop mailbox. When the devices connect, they compare their databases to determine which messages already exist in one location, so that duplicate copies are not transferred to the other. The present disclosure, however, describes an approach with duplicate prevention (conflict resolution) on a live stream of synchronous messages.

SUMMARY

Automatic delivery via a network of an electronic message or email having a recipient address associated with more than one inbox on one or more servers to inboxes associated with the recipient address may involve transmitting the email from a first Mail Transfer Agent ("MTA") to a switching MTA before delivering the email to the recipient address. Such a transmission may have to be forced from the first MTA to the switching MTA because otherwise the first MTA may attempt to deliver the email to the recipient inbox.

The switching MTA creates a copy of the email for each inbox associated with the recipient address and applies one or more email delivery policies to each copy of the email. Delivery policies may be in the form of a policy database that can be accessed by the switching MTA. By applying the appropriate delivery policy, the email may be delivered automatically to inboxes associated with the recipient address substantially simultaneous. Additionally, duplicate prevention may occur prior to delivering the email to one of the inboxes.

Duplicate prevention may involve, in certain embodiments, tagging the email as a duplicate and dropping any email tagged as a duplicate. For example, the switching MTA may create an alias delivery address, transmit the aliased email to the first mail transfer agent which forces transmission of the aliased email back to the switching MTA. The aliased address may be detected by the switching MTA which automatically drops the aliased email to substantially prevent duplicate email delivery to a single email inbox.

An exemplary embodiment of a switching MTA of the present disclosure may have machine readable instructions that when executed by a machine cause the machine to determine whether an email is a non-duplicate or tagged as a duplicate, drop any email tagged as a duplicate, identify the destination address of non-duplicate email, determine whether non-duplicate email is spam (or other unwanted content) and tag email determined to be spam as spam, match the destination address of the non-duplicate email with one or more delivery policies, derive delivery addresses for non-duplicate email based on one or more of the matched policies; create one or more copy of non-duplicate email; and deliver non-duplicate email to more than one delivery address.

Duplicate prevention may, in certain specific embodiments, include instructions to associate a first copy of non-duplicate email with a first external MTA for delivery according to the one or more of the policies matched to the recipient address, tag the first copy of non-duplicate email with a duplicate tag; and determine whether to block delivery to or deliver to the associated external mail transfer agent. This duplicate prevention process may be performed on each copy created of the non-duplicate email for each external mail transfer agent associated with each copy.

Additionally, the present disclosure contemplates a network that may include, in certain specific embodiments, a local mail transfer agent, a non-local mail transfer agent; a switching mail transfer agent; and a policy database such that email received by the switching mail transfer agent is copied, tagged, associated with a delivery policy from the policy database and delivered to the local and non-local mail transfer agents with duplicate prevention.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 2 is a diagrammatic illustration of a specific exemplary embodiment of a system of the present disclosure for normal email.

FIG. 4 is a diagrammatic illustration of a duplicate email scenario of the present disclosure.

DETAILED DESCRIPTION

Figure 1:
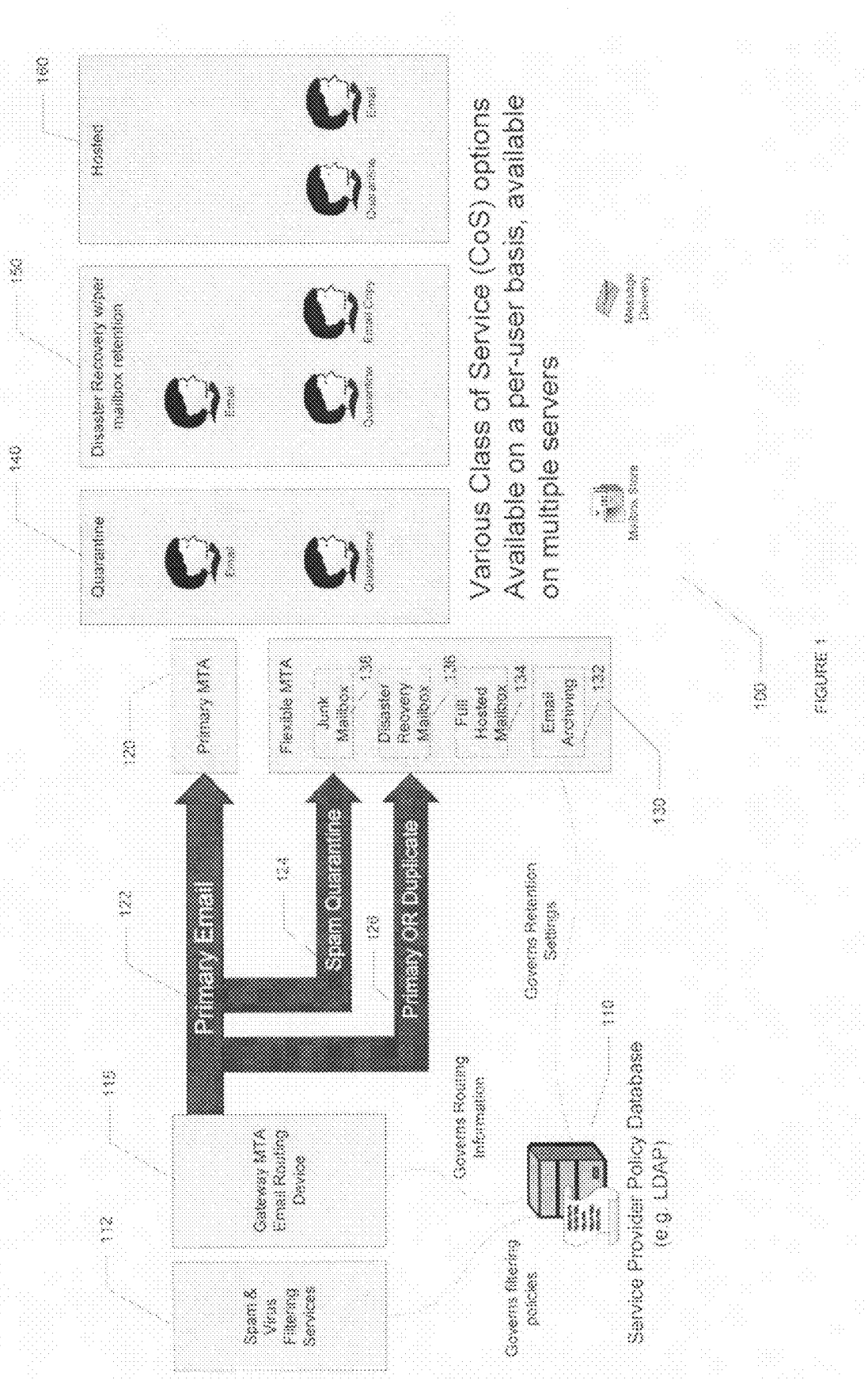
FIG. 1 is diagrammatic illustration of a specific exemplary embodiment of an email system of the present disclosure.

Referring to FIG. 1 of the drawings, FIG. 1 is diagrammatic illustration of a specific exemplary embodiment of an email system of the present disclosure. Service provider policy database ("SPPD") 110, such as for example an LDAP directory, may be programmed with rules to govern the handling of email messages for various class of service (CoS) categories 140, 150 and 160. For example, to handle spam and virus filtering services, SPPD 110 may have policies that govern filtering protocols 112. Gateway MTA 115 facilitates the routing of email to MTAs or mailboxes via primary email 122, spam quarantine 124 and primary or duplicate messages 126 pursuant to routing policies in SPPD 110.

Continuing with FIG. 1, CoS option 140 may be an option for those customers who want spam quarantined and so may include a primary email mailbox and a quarantine mailbox. CoS option 150 may be an option for customers who want disaster recovery and so need emails copied and archived. CoS 160 may be an option for customers who want hosted email so that the customer's primary email and quarantined email are on the host's server.

Gateway MTA 115 may be an email routing device to direct email 122 through primary MTA 120 for delivery to the mailbox 142 for quarantine customer 140. Spam email is routed 124 by Gateway 115 to flexible MTA 130 junk mailbox 138 for each customer 140, 150 160. Pursuant to specific policies 110, primary or duplicate email may bypass primary email 122 and may be routed 126 to flexible MTA 130 for full hosting 134, email archiving 132, disaster recovery 136 and so forth. Routing policies for Gateway MTA 115 may be found on SPPD 110 to govern these various routing protocols.

Figure 2:
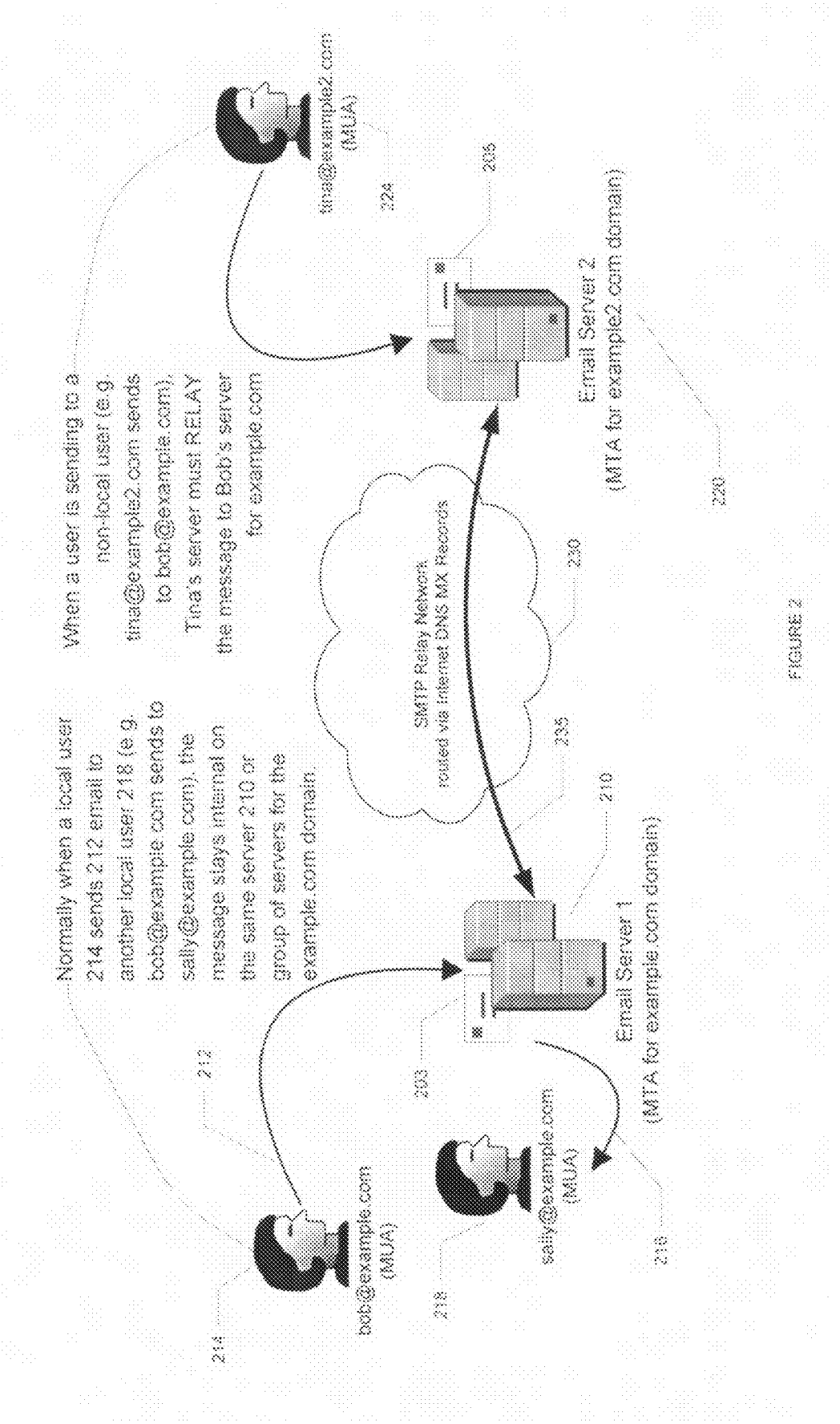

FIG. 2 is a diagrammatic illustration of a specific exemplary embodiment of a system of the present disclosure for normal email. Standard SMTP email delivery architecture assumes that a recipient email address is unique and corresponds exactly to one and only one mailbox. Accordingly, email servers 210, 220 normally treat local and non-local recipients differently. For the purposes of this disclosure, a local recipient is a recipient with the same email domain as the sender, e.g. @example.com. A non-local recipient 224 has a different email domain, e.g., @example2.com from the sender's domain. To deliver an email 203, 205 server 210 typically determines whether the recipient's address exists local on the same server 210 or within the group of servers within the domain. Server 210 simply delivers the email 203 to the recipient's mailbox if the recipient is on the same server or on a domain server 210. However, if the recipient is not local to the sender's domain, then the server 210 may forward the email 205 to the server 220 that is responsible for the recipient's address via the SMTP Relay Network 230 routed through, for example, Internet DNS MX records. Server 210 may forward email 205 to another server called a relay or server 210 may use standard DNS record lookups to find server 220 in domain example2.com.

Figure 3A:
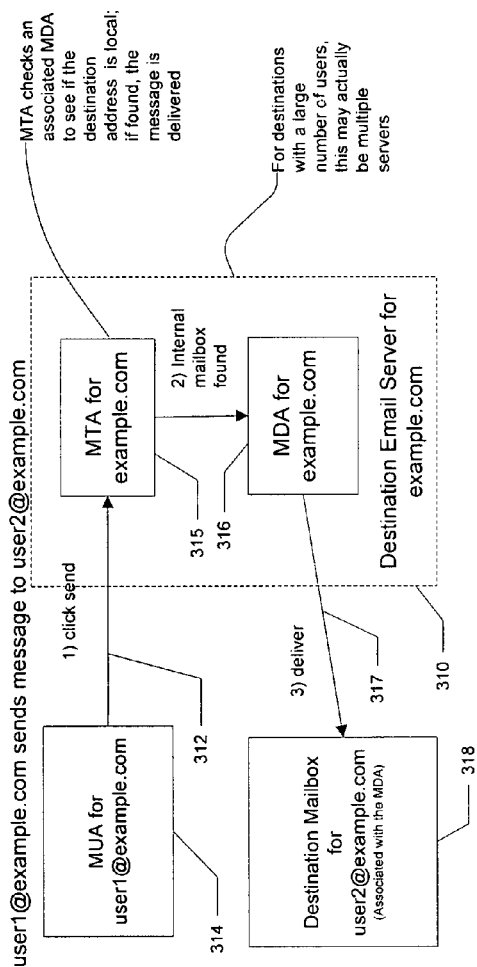
FIG. 3A is a flow chart diagram illustrating the steps of the embodiment of FIG. 2 for a local recipient.

FIG. 3A is a flow chart diagram illustrating the steps of the embodiment of FIG. 2 for a local recipient. User1 314 clicks send 312 and an email is sent to server 310 housing MTA 315 and Mail Delivery Agent ("MDA") 316. MTA 315 checks Mail Delivery Agent ("MDA") 316 to determine whether the recipient is local. If the recipient is found locally the email is delivered 317 to destination mailbox 318. It will be understood be those skilled in the art that server 310 may be one or more servers, depending for example on the number of users in the destination domain.

Figure 3B:
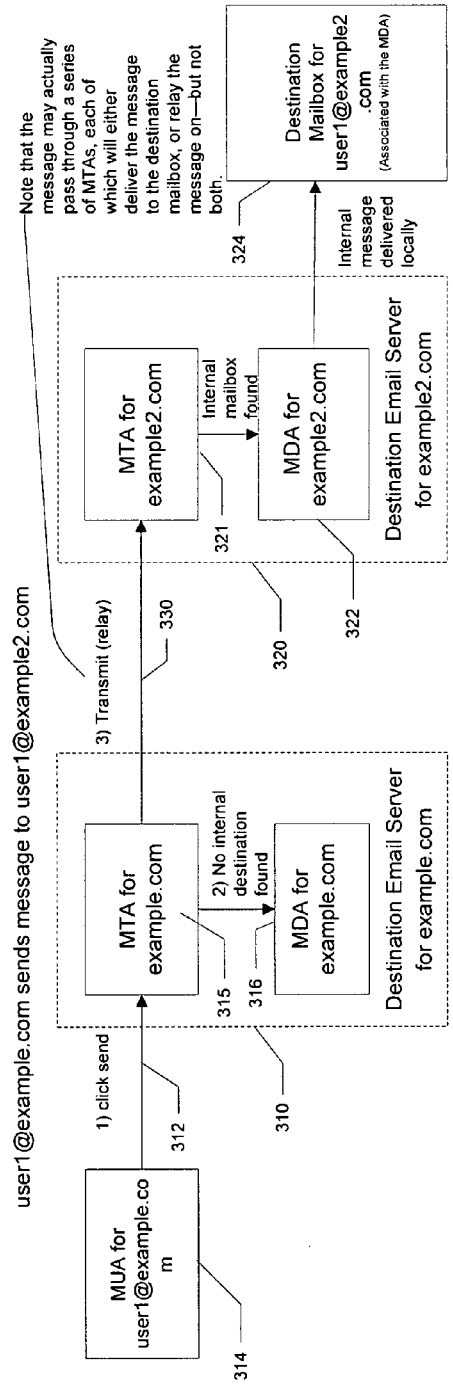
FIG. 3B is a flow chart diagram illustrating the steps of the embodiment of FIG. 2 for an external recipient.

FIG. 3B is a flow chart diagram illustrating the steps of the embodiment of FIG. 2 for an external recipient. User1 314 in domain @example.com clicks send 312 to send an email to destination mailbox 324. The email is sent to server 310. MTA 315 checks MDA 316 but does not find the recipient. MTA 315 relays 330 the email to server 320 for destination domain @example2.com. Server 320 houses MTA 321 and MDA 322. MTA 321 checks for local recipient MDA 322 and delivers the email to mailbox 324. It will be understood be those skilled in the art that relay step 330 may involve one or more MTAs, each of which may either deliver the email locally or relay the email to the next server.

FIG. 4 is a diagrammatic illustration of a duplicate email scenario of the present disclosure. Local user Bob@example.com 214 sends email 203 to another local user sally@example.com 218 on server 210. Sally has an identically addressed mailbox on another server somewhere. This might occur, for example, if Sally subscribes to an email filtering service that removes spam before delivering email to her. Thus, Sally's email address, sally@example.com exists both on her local server 210 and on her service's server. At any rate, server 210 receives Bob's email 203, finds sally@example.com locally on the same server and delivers email 203 to Sally's mailbox. Because SMTP email requires that each email recipient address be unique, server 210 takes no further action and fails to deliver email 203 to Sally's other mailbox on server 220.

Figure 5:
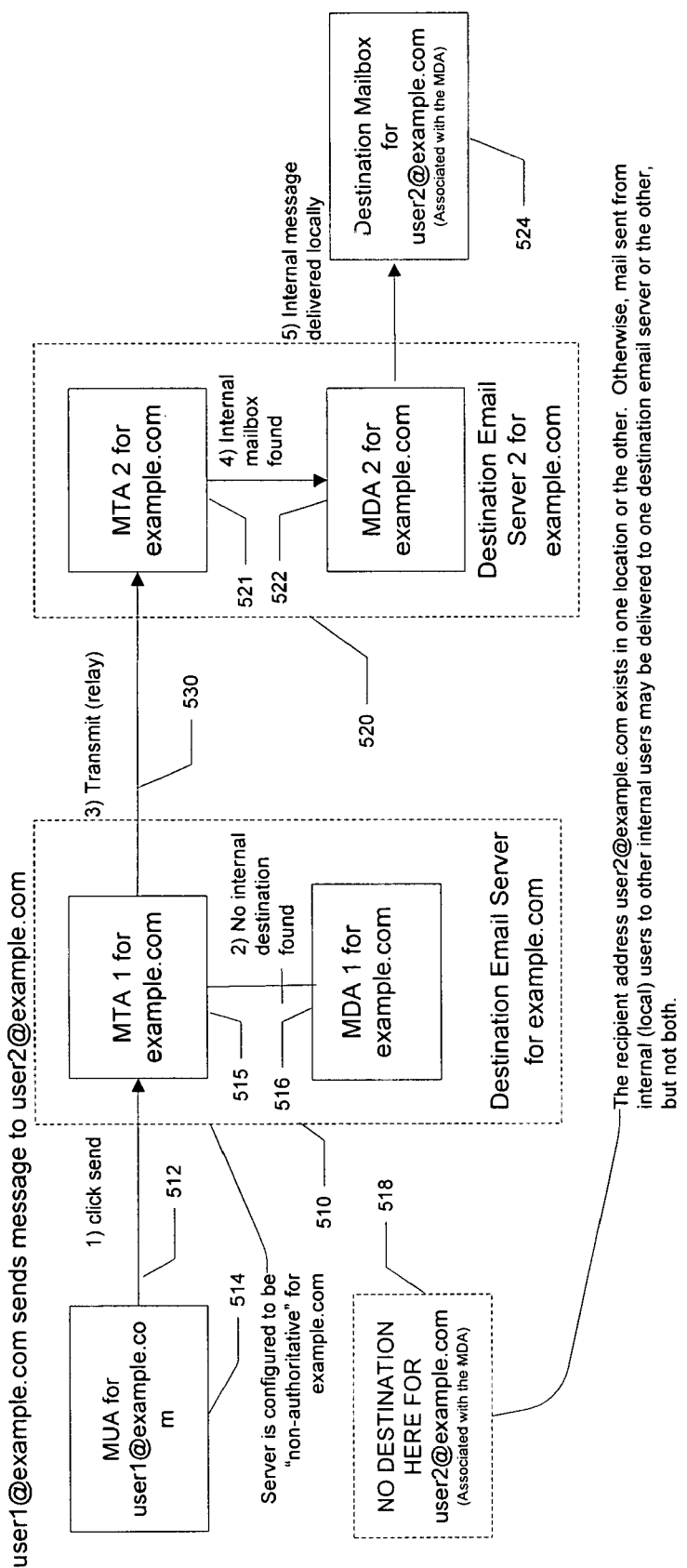
FIG. 5 is a flow chart diagram of the steps of an alternative embodiment of the split domain scenario of FIG. 4.

FIG. 5 is a flow chart diagram of the steps of an alternative embodiment of the split domain scenario of FIG. 4. User1@example.com 514 clicks send 512 to send an email to destination mailbox 518, 524 for user2@example.com. The recipient address user2@example.com, however, exists in one location or the other. Otherwise, mail sent from internal (local) users to other internal users may be delivered to one destination email server or the other, but not both. MTA 512 in server 510 finds no internal destination 518 for user2@example.com and relays 520 the email to serve 520 housing MTA 2 521 and MDA 2 522. MTA 2 finds internal mail box and delivers email to user2@example.com mailbox 524.

Figure 6:
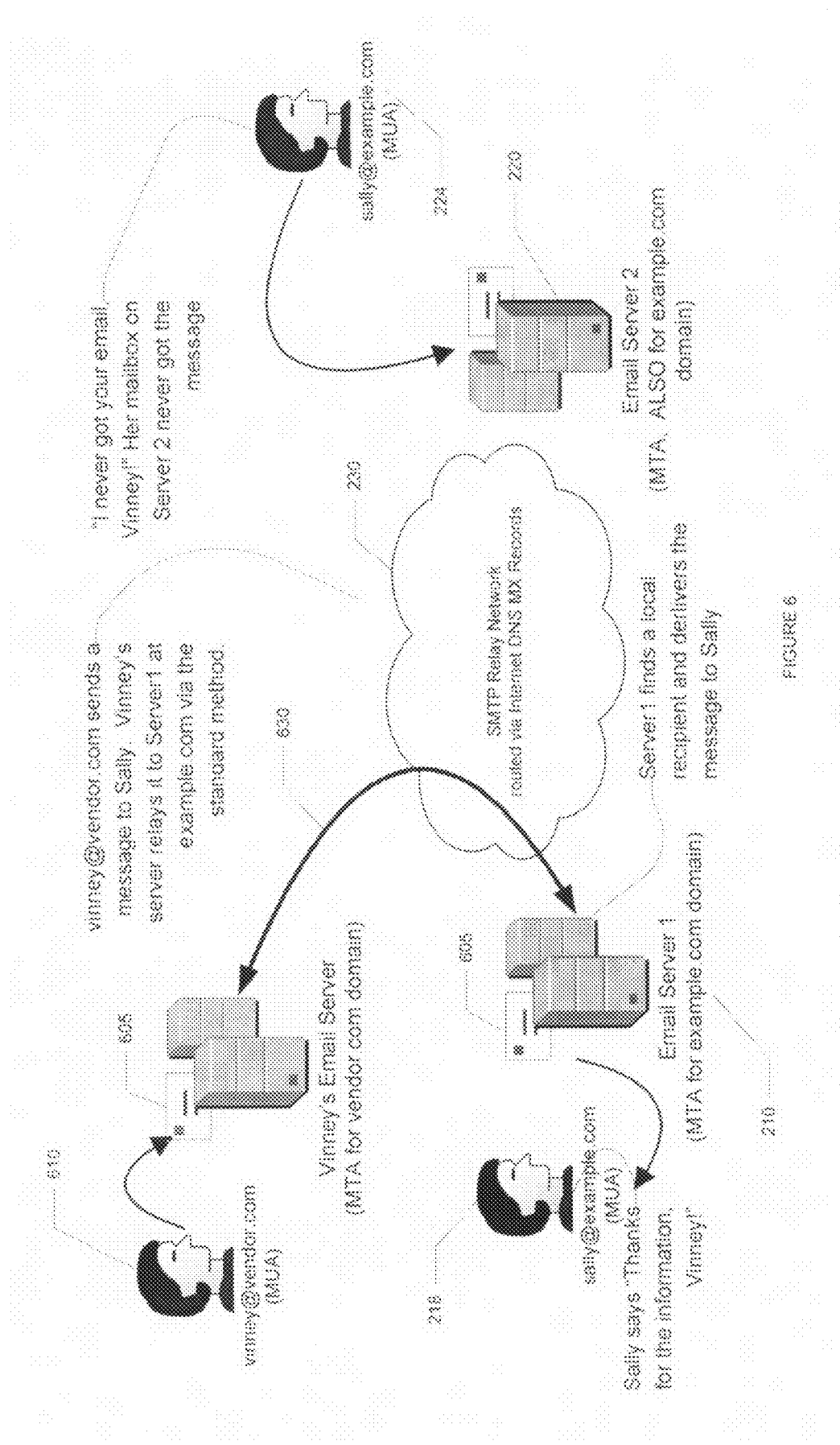
FIG. 6 is a diagrammatic illustration of a duplicate email scenario with a remote sender of the present disclosure.

FIG. 6 is a diagrammatic illustration of a duplicate email scenario with a remote sender of the present disclosure. Sender vinney@vendor.com 1460 sends email 605 from external email domain @vendor.com through external server 620 to sally@example.com 218 on server 210. As described above for the scenario of FIGS. 4 and 5, Sally has an identical email address on server 220 somewhere else. Vinney's server 620 does not recognize sally@example.com as a local recipient and so it checks 630 through SMTP Relay Network 230 the DNS MX records, finds the example.com domain and delivers email 605 to Sally's mailbox on server 210. SMTP standards only require that a sending server 620 deliver an email to a single server (even if multiple server are listed), it correctly assumes that it does not need to deliver a copy of email 605 to server 220. Therefore email 605 is not delivered to Sally's mailbox on server 220.

Figure 7:
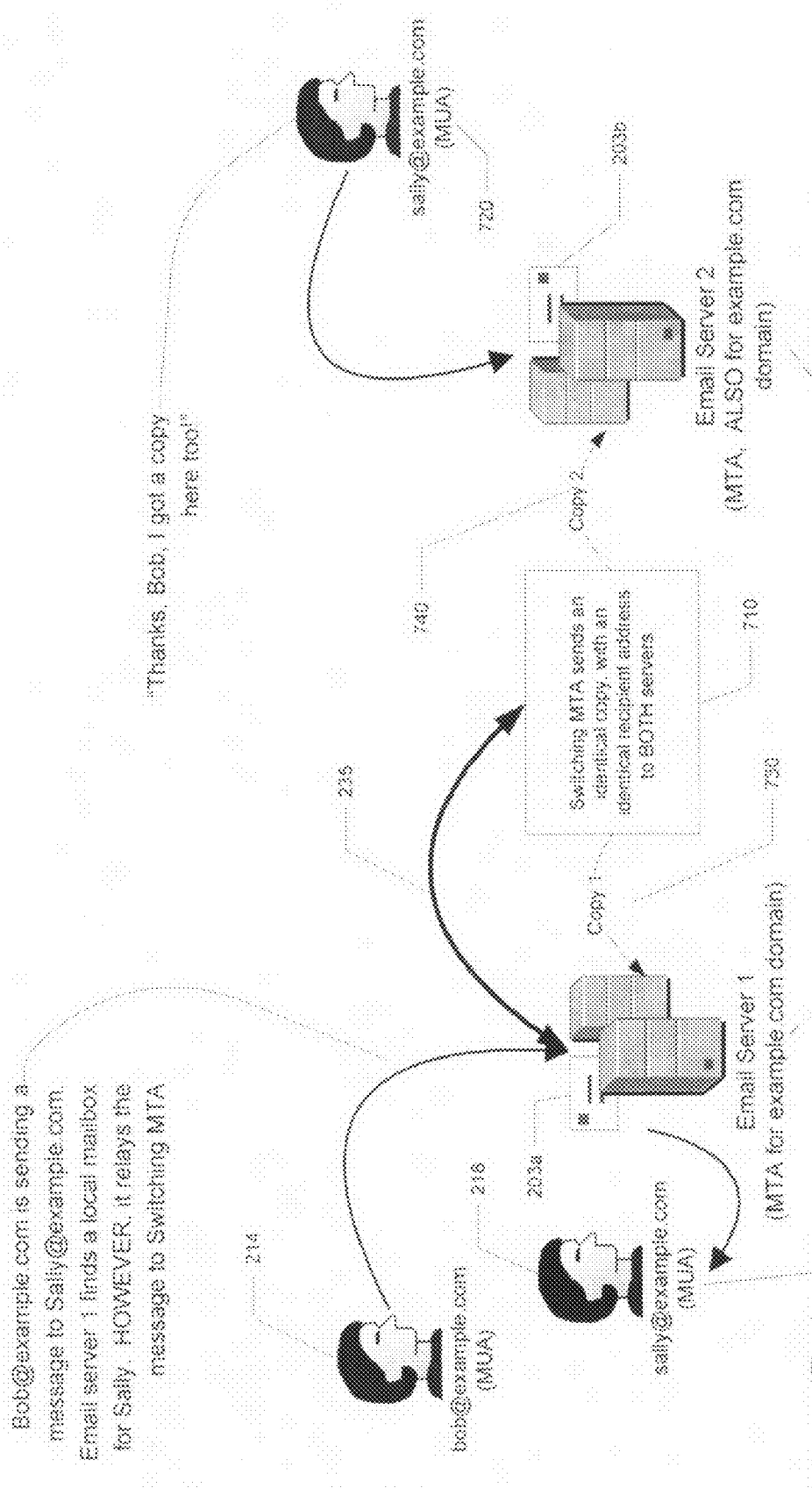
FIG. 7 is a diagrammatic illustration of the duplicate email scenario of FIG. 2 with a specific exemplary embodiment of a switching MTA of the present disclosure.

FIG. 7 is a diagrammatic illustration of the duplicate email scenario of FIG. 2 with a specific exemplary embodiment of a switching MTA of the present disclosure. One approach to the scenario illustrated in FIG. 2, above, may be to configure server 210 so that it relays 134 substantially all sent email messages (even those to local recipients) to another server 710 for delivery. While it may be not be unusual for a server to relay a message for a remote recipient, it is typically considered in the art to be inefficient to relay messages for local recipients. Indeed, the business email servers provided by at least one of the highest volume email server providers is incapable of relaying local email to an external server and is incapable of being configured to do so.

An email hosting platform, however, based on an open source, such as Linux, system to run a modified Postfix MTA, for example, may accept a lot of customization. In fact, despite the lack of any existing documentation, the present inventors produced the desired "local relay" action with a customize-configured open source server 210.

The external server 710 receives the relayed local email message and, in a certain embodiments, creates a duplicate copy of the email and then delivers copy 1 730 to recipient server 210 and copy 2 740 to recipient server 220 so that sally@example.com receives email 203a in her mailbox on server 210 and identical email 203b in her mailbox on server 220.

Duplication of an email by a server is unusual because of the assumed uniqueness of email addresses. A rare instance of server duplication may be accomplished with arcane scripting commands for automatically blind copying recipients on certain types of messages.

For Sally to receive the email message at both of her mailboxes, email relaying and email copying functions were combined.

Figure 8:
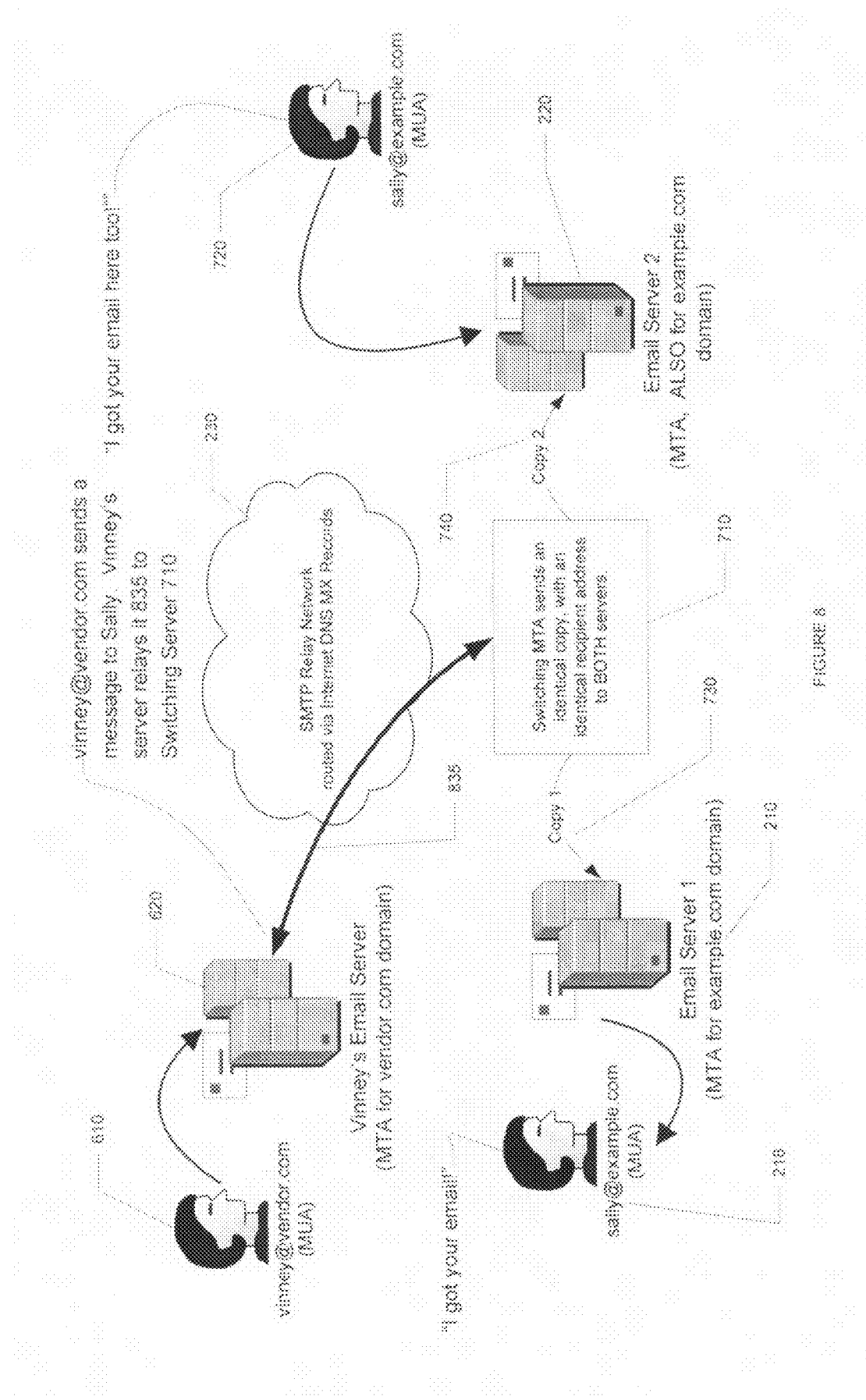
FIG. 8 is a diagrammatic illustration of the duplicate email scenario of FIG. 6 with a specific exemplary embodiment of a switching MTA of the present disclosure.

FIG. 8 is a diagrammatic illustration of the duplicate email scenario of FIG. 6 with a specific exemplary embodiment of a switching MTA of the present disclosure. Remote sender Vinney 610 sends a message to Sally who has an inbox with the same recipient address on both server 210 and 220. Vinney's server 620 transmits 835 the email to switching MTA 710, which makes a copy of the email and delivers one copy to server 210 and the other copy to server 220. The case for a remote sender 610 is somewhat simpler than that described above for the local sender 214 (FIG. 7) because the relay step is not involved and only email duplication may be performed at server 710 for delivery to servers 210, 220.

Figure 9:
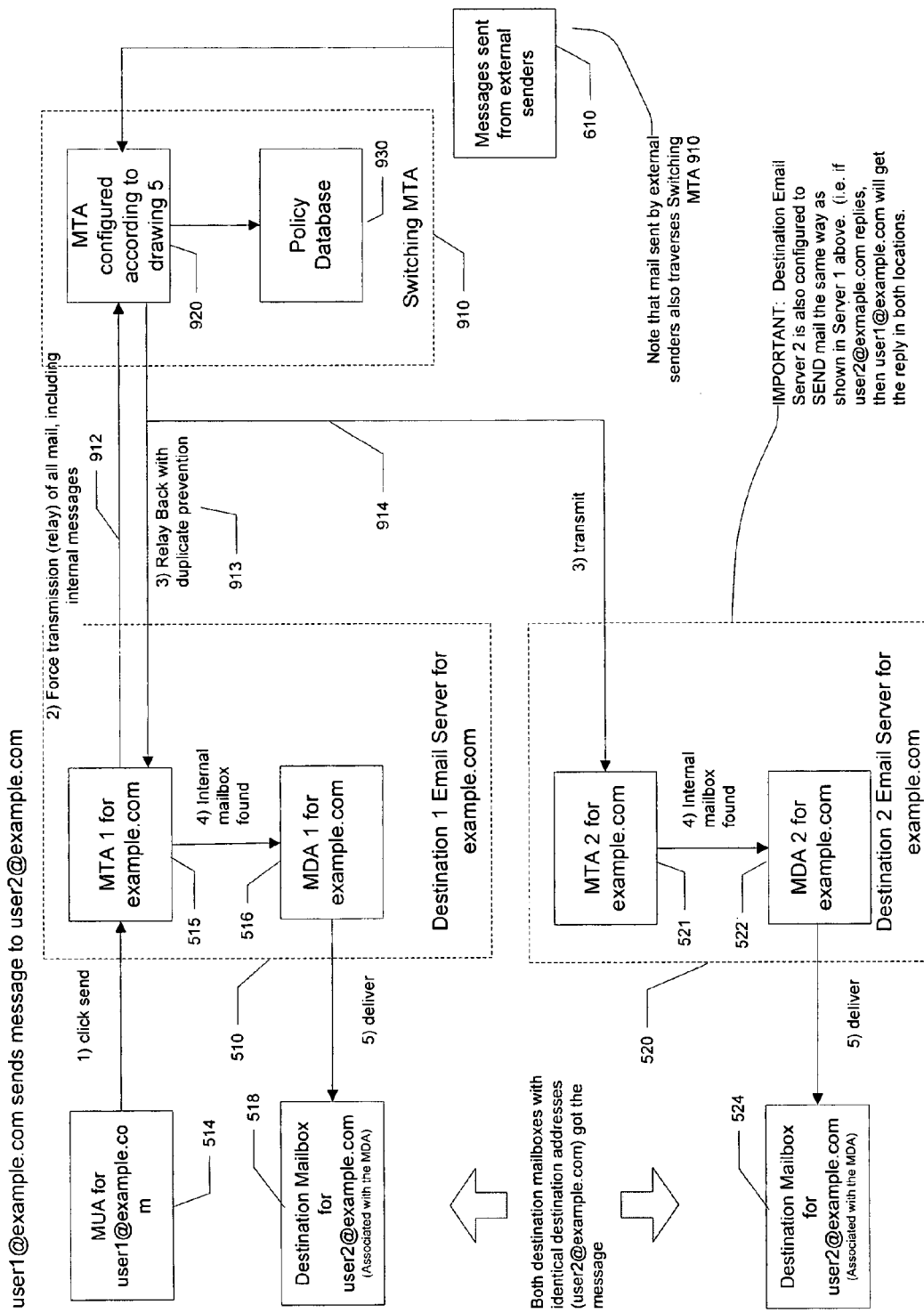
FIG. 9 is a flow chart diagram of the steps of an alternative embodiment of the switching MTA scenarios of FIGS. 7 and 8.

FIG. 9 is a flow chart diagram of the steps of an alternative embodiment of the switching MTA scenarios of FIGS. 7 and 8. Click 512 sends the transmission intended for recipient user2@example.com to server 510 as described above, however, server 510 in specific embodiments is configured to force transmission (relay) all email to flexible server 910 which houses switching MTA 920 and policy database 930 (See FIG. 1, SPPD 110). Email for user2@example.com from external sender 1460 also goes to server 910. Applying the policies in DB 930, MTA 920 processes incoming email to bounce relayed transmissions back, or external email directly, to server 510 for delivery to destination mailbox 518 and also forwards a copy of the email 914 to server 520 for delivery to destination mailbox 524.

Figure 10:
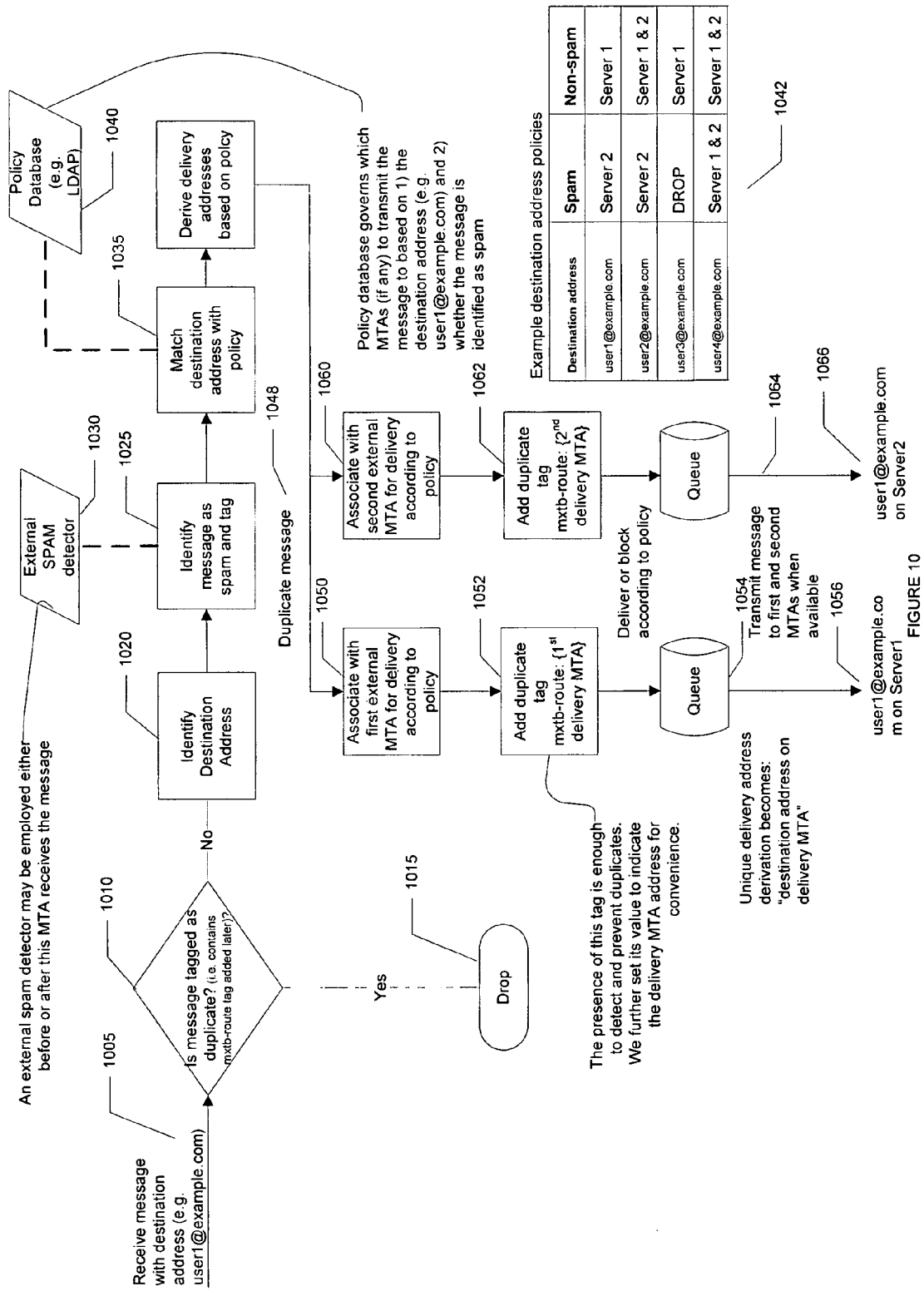
FIG. 10 is a flow chart diagram of a specific exemplary embodiment of a switching MTA process of the present disclosure.

FIG. 10 is a flow chart diagram of a specific exemplary embodiment of a switching MTA process of the present disclosure. The elements in the process need not be performed in any particular order and therefore are not necessarily "steps" so much as they are functions, actions or activities performed by the switching MTA. Accordingly, the directional arrows of FIG. 10 are to be considered illustrative of a particular exemplary embodiment and are not intended to limit the present disclosure. Detect 1005 incoming message with destination address (e.g., user1@example.com. Query "is message tagged as a duplicate?" (i.e., contains mxtb route tag added later). If yes then drop message 1015. If no then identify 1020 destination address. Identify message as spam and tag 1025 with spam detector 1030 (this activity may be optionally or selectively performed before or after the incoming message is received 1005.) Spam identification and tagging may be considered a short-hand way to refer to enforcement policies that may be employed to screen out unwanted or malicious email which may contain, for example, viruses, worms, undesirable content and so forth, as well as spam.

Continuing with the description of FIG. 10, match destination address with policy 1035. Matching 1035 may involve policy database 1040. Examples of some destination address policies are shown in Table 1042. Derive delivery addresses based on policy 1040. Duplicate message 1048. Associate 1050 the original message with a first external MTA for delivery according to policy. Add duplicate tag mxtb for a first delivery MTA. Transmit first tagged message to a first queue 1054 and then deliver 1056 message to mailbox on server 1.

Associate 1060 the copy message with a second external MTA for delivery according to policy. Add duplicate tag mxtb for a second delivery MTA 1062. Transmit second tagged message to a second queue 1064 and deliver the copy message to mailbox 1066 on server 2.

Figure 11:
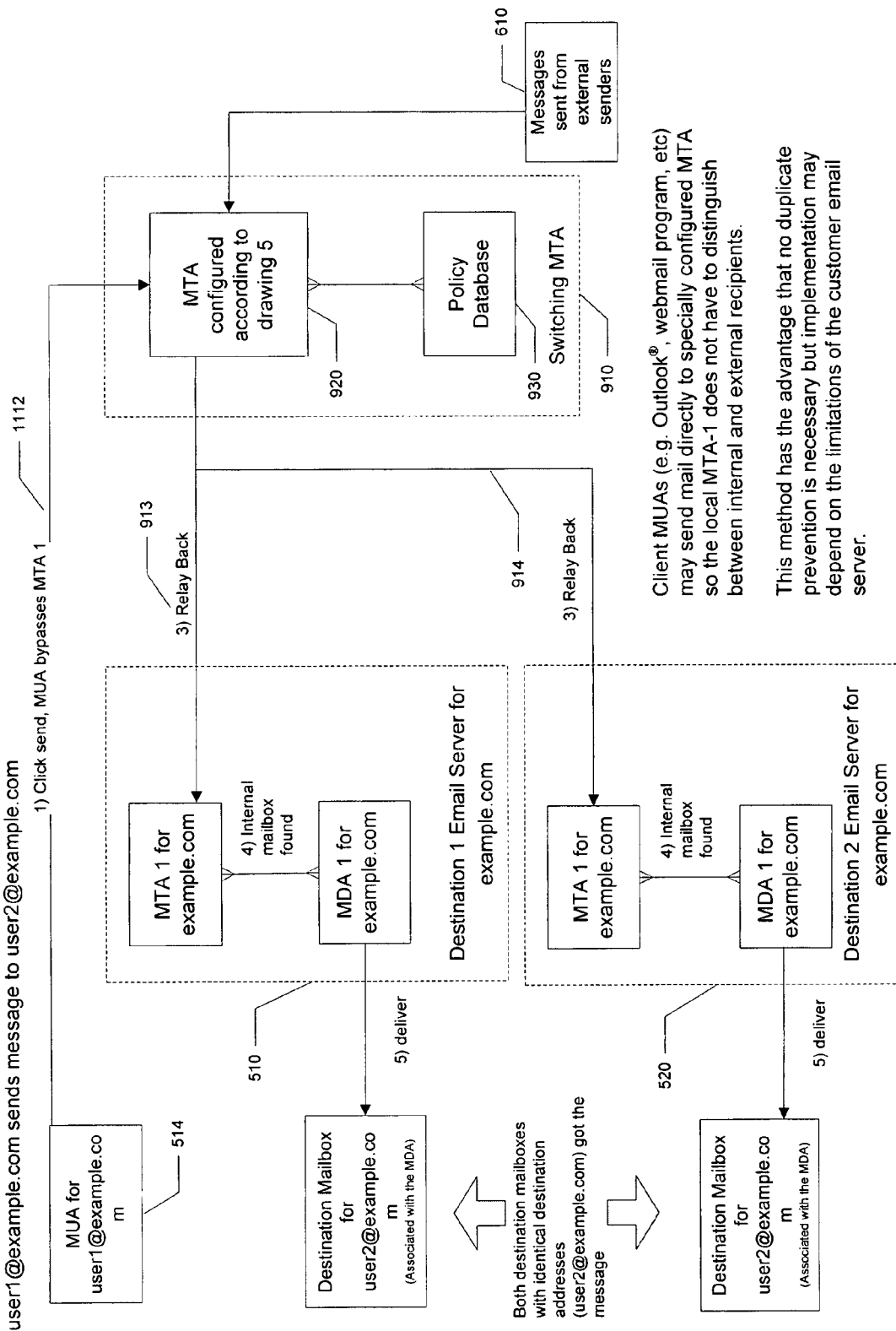
FIG. 11 is a flow chart diagram of a specific exemplary embodiment of a bypass method of forcing transmission of local messages of the present disclosure.

FIG. 11 is a flow chart diagram of a specific exemplary embodiment of a bypass method of forcing transmission of local messages of the present disclosure. Client email Mail User Agents ("MUA"s) send email directly 1112 to a specially configured MTA 920 on server 910 (See FIG. 10). Local MTA 515 does not have to distinguish between internal (local) and external recipients. Examples of well known client MUAs may include Outlook®, Yahoo® mail and Gmail®. An advantage of the method illustrated in FIG. 11 is that duplicate prevention is rendered moot. However, the customer's email server may have limitations in the extent to which it can be configured in accordance with the method of this embodiment.

Figure 12:
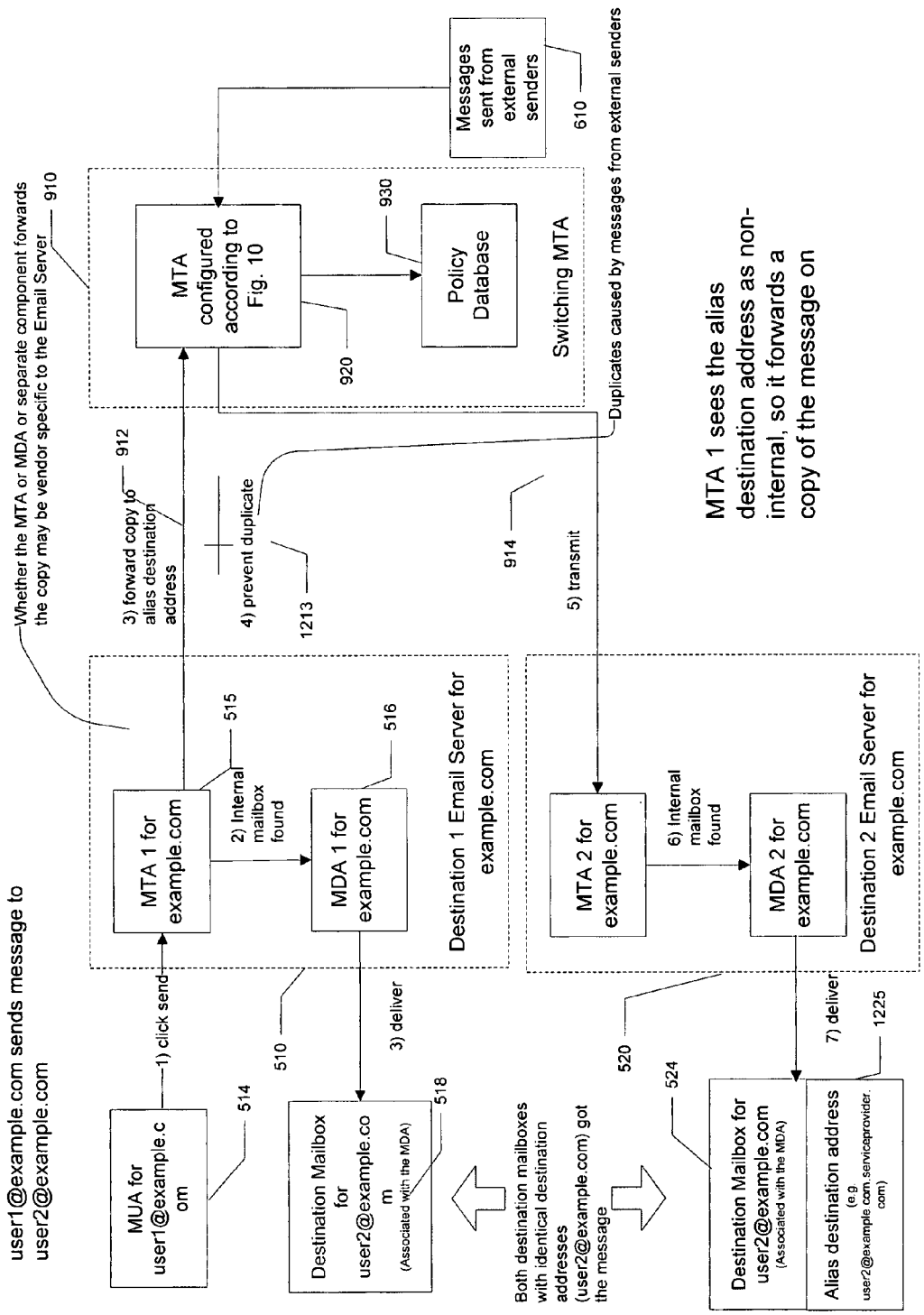
FIG. 12 is a flow chart diagram of a specific exemplary embodiment of a forwarding method of forcing transmission of local messages of the present disclosure.

FIG. 12 is a flow chart diagram of a specific exemplary embodiment of a forwarding method of forcing transmission of local messages of the present disclosure. MTA 515 receives email from user1@example.com MUA 514 intended for user2@example.com who has a local mailbox 518 and an external mailbox 524 with the same email address. MTA 515 finds local destination mailbox 518 locally and delivers the email there through MDA 516. Ordinarily, that would be the end of story and User2 would not receive the email mail at the second mailbox 524. To deliver the email to both mailboxes, MTA 515 makes a copy of the email and forwards the copy 912 to MTA 920 configured in accordance with FIG. 10.

The duplicate email is processed by MTA 920 pursuant to one or more policies 930 which, for example, appends a service provider domain to the destination email address to create an alias destination address. MTA 920 then transmits 914 the duplicate email to mailbox 524 through server 520.

An email from external sender 610 goes directly to MTA 920 which transmits a copy to MTA 515 and also transmits 914 an aliased copy to mailbox 524 through server 520. MTA 515 delivers a copy of the email locally to mailbox 518 and also bounces a copy back to MTA 920 just as it did for the local sender as described above. MTA 920 then creates another aliased email for delivery to mailbox 524. This is now a duplicate aliased email (an aliased email has already been delivered to mailbox 524). Duplicate preventor 1213, however, blocks the delivery of the duplicate to mailbox 524 so the user2@example.com receives only one copy of the email in each mailbox.

Figure 13:
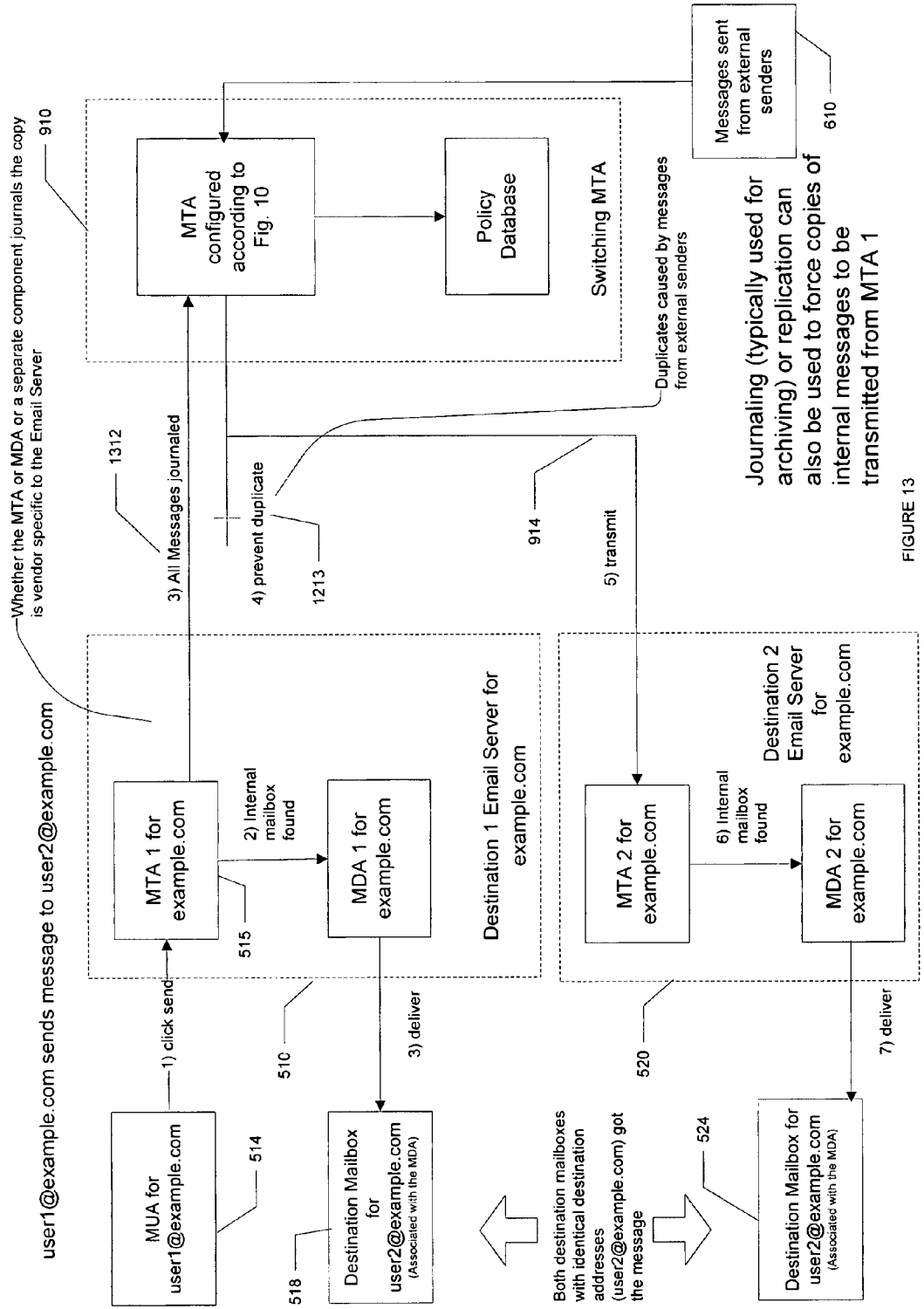
FIG. 13 is a flow chart diagram of a specific exemplary embodiment of a journaling method of forcing transmission of local messages of the present disclosure.

FIG. 13 is a flow chart diagram of a specific exemplary embodiment of a journaling method of forcing transmission of local messages of the present disclosure. Email received at MTA 515 is journaled or replicated 1312 and transmitted to server 910 as described above. Journaling is typically used for archiving but here it has been adapted to force copies of internal messages to be transmitted from MTA 515.

Figure 14:
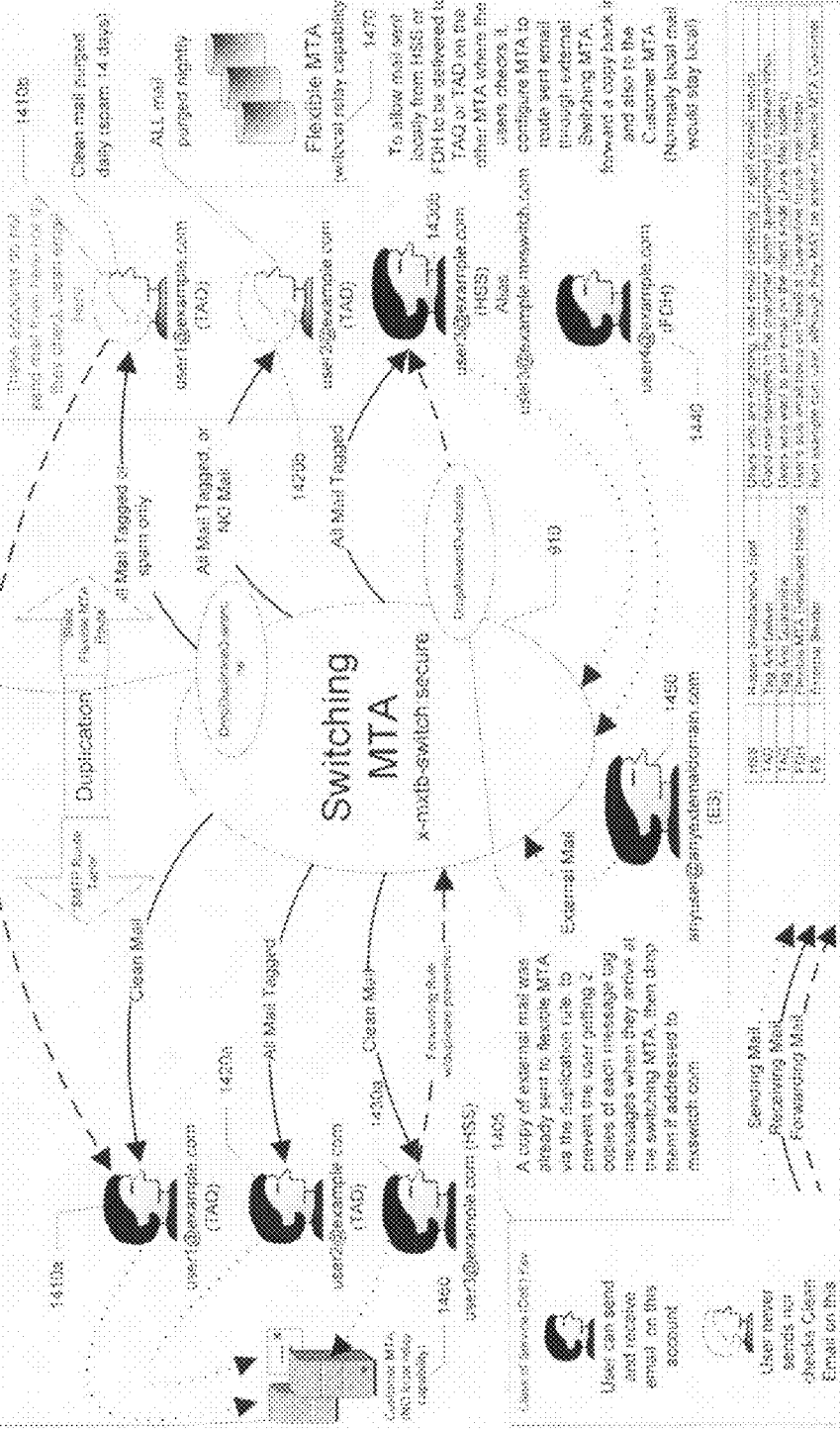
FIG. 14 is a diagrammatic illustration of a specific exemplary embodiment of a system of the present disclosure.

FIG. 14 is a diagrammatic illustration of a specific exemplary embodiment of a system of the present disclosure. Class of Service (CoS) Key 1405 provided for convenient reference only, explains that:

HSS (Hosted Simultaneous Split) refers to users who are migrating and need emila continuity or split domain set ups;

TAQ (Tag and Quarantine) refers to users who get good mail delivered and spam quarantined in a separate inbox;

TAD (Tag and Deliver) refers to users who want to sort email on the client side (e.g., junk mail folder);

FDH (Flexible MTA Dedicated Hosting) refers to users whose sole email is on flexible MTA 1470 with quarantine to junk mail box; and ES (External Sender) refers to a user outside the "example.com" domain, although an ES may be a customer on flexible MTA 1470.

On the right side of FIG. 14, flexible MTA 1470 exists in an email environment in which local relaying may occur, so split domain routing may be accomplished in a symmetric manner as described above. On the left side of FIG. 14, customer MTA 1460, in contrast, is not capable of local relay. MTAs that are not capable of local relay may, nevertheless, be capable of automatically forwarding email. An exemplary embodiment of a system of the present disclosure may exploit the ability to automatically forward email to deliver a duplicate email message in accordance with the present disclosure.

Switching MTA 910 mediates the system of the depicted embodiment. Specific embodiments may provide a system where all recipients may reside on flexible MTA 910 for LDAP acceptance check. Specific embodiments may further provide a system where a given recipient exists on a customer's MTA 1460 as well as on flexible MTA 1470 to enhance the reduction of bounces. Email that passes through Switching MTA 910 is duplicated and a copy is sent to the recipient's inbox on flexible MTA 1470 with another copy going via STMP to the recipient's inbox on customer MTA 1460.

Figure 15:
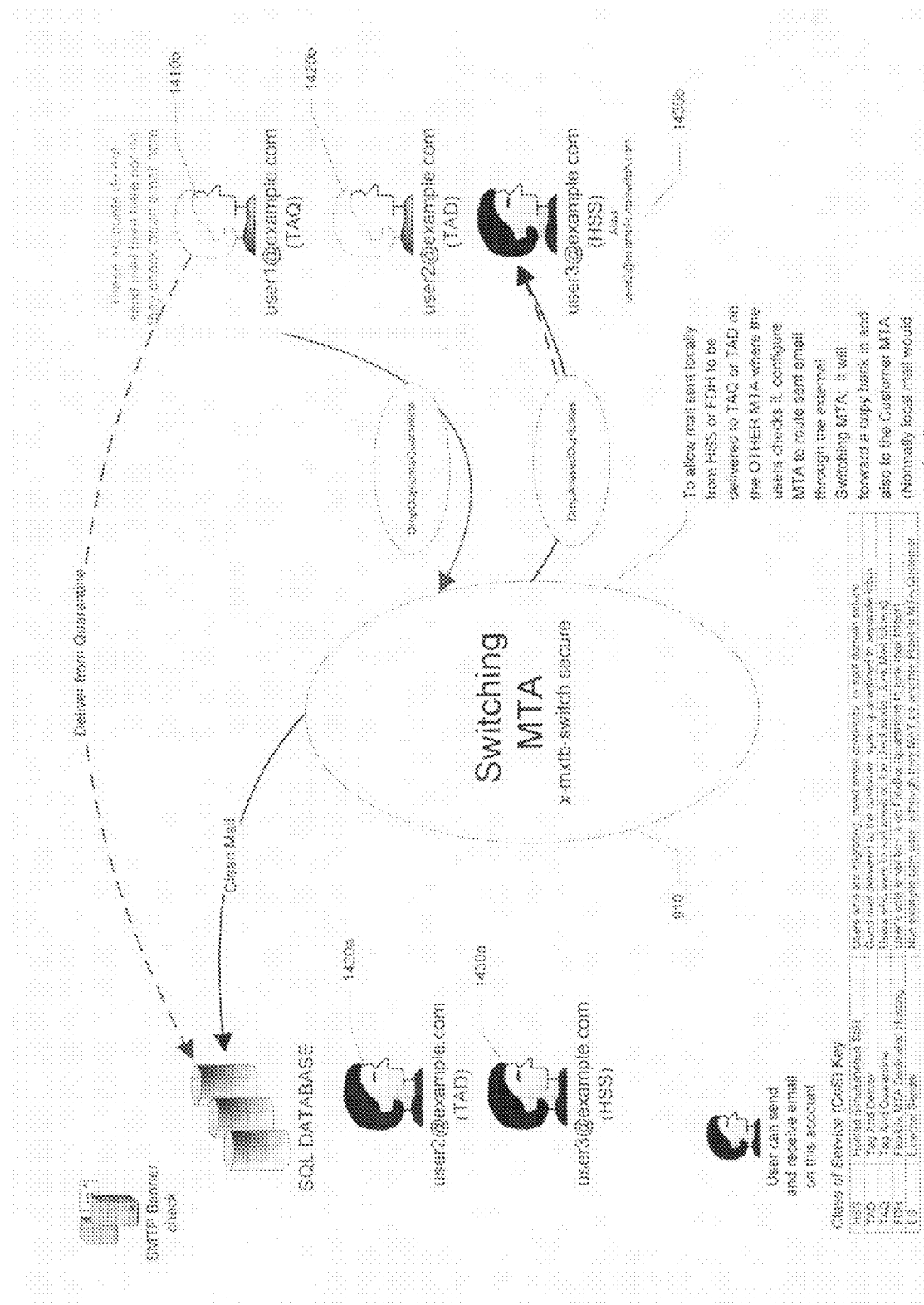
FIG. 15 is diagrammatic illustration of an exemplary embodiment of a specific exemplary scenario of FIG. 14.

FIG. 15 is diagrammatic illustration of an exemplary embodiment of a specific exemplary scenario of FIG. 14. To allow mail sent locally from HSS 1430a/b or FDH to be delivered to TAQ 1410a (FIG. 14) or TAD 1420a on the other MTA where the users check it, configure MTA 1470 (FIG. 14) to route sent email through the external Switching MTA 910; it will forward a copy back in and also to the Customer MTA 1460 (FIG. 14). Normally local mail stays local.

In addition to the foregoing embodiments, the present disclosure provides programs stored on machine readable medium to operate computers and devices according to the present disclosure. Machine readable media include, but are not limited to, magnetic storage medium (e.g., hard disk drives, floppy disks, tape, etc.), optical storage (CD-ROMs, optical disks, etc.), and volatile and non-volatile memory devices (e.g., EEPROMs, ROMs, PROMs, RAMs, DRAMs, SRAMs, firmware, programmable logic, etc.). Furthermore, machine readable media include transmission media (network transmission line, wireless transmission media, signals propagating through space, radio waves, infrared signals, etc.) and server memories. Moreover, machine readable media includes many other types of memory too numerous for practical listing herein, existing and future types of media incorporating similar functionally as incorporate in the foregoing exemplary types of machine readable media, and any combinations thereof. The programs and applications stored on the machine readable media in turn include one or more machine executable instructions which are read by the various devices and executed. Each of these instructions causes the executing device to perform the functions coded or otherwise documented in it. Of course, the programs can take many different forms such as applications, operating systems, Perl scripts, JAVA applets, C programs, compilable (or compiled) programs, interpretable (or interpreted) programs, natural language programs, assembly language programs, higher order programs, embedded programs, and many other existing and future forms which provide similar functionality as the foregoing examples, and any combinations thereof.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of delivering an original electronic message to one or more points of delivery that are not specified in the destination address of the original message, the method comprising:
   providing one or more duplicating mail transfer agents to receive one or more original electronic messages and make one or more copies of the original messages, wherein each copy has the same destination address as its original message;
   receiving at one of the duplicating electronic mail transfer agents, the original electronic message with a destination address;
   providing a database accessible by the one or more duplicating mail transfer agents of additional mail transfer agents associated with the destination address of the original message;
   making one or more copies of the original messages by the one or more duplicating mail transfer agents, wherein each copy has the same destination address as the original message;
   associating one of the additional mail transfer agents from the database to each copy of the original messages, wherein each mail transfer agent is different from each of the other mail transfer agents so that each copy of the messages has a point of delivery different from each of the other copies;
   transmitting the original electronic message towards its destination address; and
   transmitting each copy of the messages synchronously towards its respective associated mail transfer agent.

2. The method of claim 1 wherein at least one of the additional mail transfer agents delivery addresses is a duplicating mail transfer agent.

3. The method of claim 1 further comprising determining whether one or more of the copy messages would be delivered to the same mail transfer agent as another copy and if so then dropping the copy electronic message.

4. The method of claim 3 wherein the step of determining whether the copy electronic message is a duplicate further comprises examining a tag on the electronic message, the tag being indicative of the transmitting of the copy electronic message to at least one of the mail transfer agents.

5. The method of claim 1 further comprising identifying one or more of the copy messages as spam.

6. The method of claim 1 wherein transmitting one of the copy electronic messages toward its associated mail transfer agent further comprises transmitting the copy electronic message to a queue.

7. The method of claim 6 further comprising transmitting the copy-electronic message from the queue if an electronic message transfer agent associated with its destination address is available.

8. A method for automatically delivering via a network an email having a recipient address associated with more than one inbox on one or more mail transfer agents to inboxes associated with the recipient address, the method comprising the steps of:
   providing one or more duplicating mail transfer agents to receive one or more original electronic messages and make one or more copies of the original messages, wherein each copy has the same recipient address as its original message;
   providing a database of additional mail transfer agents associated with the recipient address;
   transmitting the email from a first mail transfer agent to one of the duplicating transfer agents before delivering the email to the recipient address;
   creating a copy of the email for each mail transfer agent associated with the recipient address, wherein the copy has the same destination address as the original;
   applying one or more email addressing policies to each copy of the email to associate the recipient address with one or more mail transfer agents; and
   delivering the email automatically and synchronously to mail transfer agents associated with the recipient address.

9. The method of claim 8, further comprising the step of duplicate prevention prior to delivering the email to one of the additional mail transfer agents.

10. The method of claim 9, wherein the step of duplicate prevention comprises tagging a duplicate email as a duplicate and preventing delivery of the email tagged as a duplicate.

11. The method of claim 8, wherein the step of duplicate prevention comprises creating an alias delivery address at the one or more duplicating mail transfer agents, transmitting the aliased email to the first mail transfer agent;
   forcing transmission of the aliased email back to one of the duplicating mail transfer agents;
   detecting the aliased address at the one or more duplicating mail transfer agents and dropping the aliased email by one of the duplicating mail transfer agents.

12. The method of claim 8, wherein the one or more duplicating mail transfer agents interact with an address policy database for applying one of the address policies to the email.

13. The method of claim 8, wherein the recipient address resides on a mail transfer agent [at least one of the inboxes resides on a different server] from at least one of the other mail transfer agents.

14. The method of claim 8, wherein each copy of the email is delivered to the mail transfer agents substantially synchronously.

15. A network comprising:
- one or more local mail transfer agents;
- one or more non-local mail transfer agents networked with at least one of the local mail transfer agents;
- one or more duplicating mail transfer agents networked with at least one of the local and at least one of the non-local mail transfer agents; and
- at least one address policy database accessible by at least one of the one or more duplicating mail transfer agents, wherein the database contains additional non-local delivery addresses associated with at least one of the one or more local mail transfer agents;
- wherein an email received by one of the duplicating mail transfer agents is copied, tagged, associated with an address policy from the policy database and delivered to at least one of the one or more local and at least one of the one or more non-local mail transfer agents with duplicate delivery prevention.

16. The network of claim 15, wherein at least one of the local mail transfer agents does not have local relay capability and is configured to force transmission of the email to one of the non-local duplicating mail transfer agents, and further wherein the non-local duplicating mail transfer agent is configured to bounce the email back to the local mail transfer agent with duplicate delivery prevention.

17. The network of claim 15, further comprising one or more spam detectors external to at least one of the duplicating mail transfer agents.

18. The network of claim 15, further comprising an SMTP relay network connecting at least one of the local and at least one of the non-local mail transfer agents.

* * * * *